(12) United States Patent
Kashiwagi et al.

(10) Patent No.: US 7,241,823 B2
(45) Date of Patent: Jul. 10, 2007

(54) RADIATION CURING SILICONE RUBBER COMPOSITION, ADHESIVE SILICONE ELASTOMER FILM FORMED FROM SAME, SEMICONDUCTOR DEVICE USING SAME, AND METHOD OF PRODUCING SEMICONDUCTOR DEVICE

(75) Inventors: Tsutomu Kashiwagi, Annaka (JP); Shinji Makikawa, Takasaki (JP); Toshiyuki Sutou, Annaka (JP); Toshio Shiobara, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 601 days.

(21) Appl. No.: 10/732,519

(22) Filed: Dec. 11, 2003

(65) Prior Publication Data

US 2004/0127613 A1    Jul. 1, 2004

(30) Foreign Application Priority Data

Dec. 11, 2002  (JP) .............................. 2002-359974
Jun. 12, 2003  (JP) .............................. 2003-167519

(51) Int. Cl.
  *C08K 5/24* (2006.01)
(52) U.S. Cl. ...................... 524/261; 524/262; 524/264; 524/265; 524/266; 524/267; 524/268
(58) Field of Classification Search ................ 524/261, 524/262, 264, 265, 266, 267, 268
See application file for complete search history.

(56) References Cited

U.S. PATENT DOCUMENTS

| 3,159,601 A | 12/1964 | Ashby |
| 3,159,662 A | 12/1964 | Ashby |
| 3,220,972 A | 11/1965 | Lamoreaux |
| 3,445,420 A | 5/1969 | Kookootsedes et al. |
| 3,517,001 A | 6/1970 | Berger |
| 3,532,649 A | 10/1970 | Smith |
| 3,699,073 A | 10/1972 | Wada et al. |
| 3,775,452 A | 11/1973 | Karstedt |
| 3,821,218 A | 6/1974 | Berger |
| 6,069,186 A | 5/2000 | Okinoshima et al. |
| 6,312,553 B1 | 11/2001 | Okinoshima et al. |
| 2003/0190484 A1 | 10/2003 | Kashiwagi et al. |

*Primary Examiner*—Edward J. Cain
(74) *Attorney, Agent, or Firm*—Oblon, Spivak, McClelland, Maier & Neustadt, P.C.

(57) ABSTRACT

There are provided a radiation curing silicone rubber composition that is useful for the bonding of substrates, an adhesive silicone elastomer film formed from such a composition, a structural body in which two substrates are bonded via a cured layer formed from the composition, and a method of producing such a structural body. The composition includes: (a) an organohydrogenpolysiloxane containing at least one group selected from the group consisting of acryloyl groups and methacryloyl groups, and at least one hydrosilyl group; (b) a fluid organopolysiloxane with at least two groups which are each selected from the group consisting of acryloyl groups and methacryloyl groups, and with no hydrosilyl groups; (c) a compound selected from the group consisting of alkoxysilanes, partial hydrolysis-condensation products of alkoxysilanes, organosilane-modified isocyanurates and organosiloxane-modified isocyanurates; (d) a radiation sensitizer; and (e) a platinum group metal-based catalyst. The composition is of low elasticity, while also providing excellent heat resistance, adhesion, and workability.

18 Claims, 1 Drawing Sheet

RADIATION CURING SILICONE RUBBER COMPOSITION, ADHESIVE SILICONE ELASTOMER FILM FORMED FROM SAME, SEMICONDUCTOR DEVICE USING SAME, AND METHOD OF PRODUCING SEMICONDUCTOR DEVICE

BACKGROUND OF THE INVENTION

1. Field of the Invention

The present invention relates to a radiation curing silicone rubber composition, an adhesive silicone elastomer film that has been molded from the composition, a silicone elastomer film coated body using the adhesive silicone elastomer film, and structural body comprising an adhesive layer formed from said composition between substrates, and methods of producing the structural body.

2. Description of the Prior Art

Conventionally, epoxy-based adhesive films have been used for the die bonding of semiconductor devices, and for TAB tape bonding applications. However, these epoxy-based adhesive films display inadequate heat resistance and are not able to be converted to low elasticity forms (in other words, if for example, a highly elastic film is bonded as an adhesive layer between two different substrates, then the film tends to display poor thermal and mechanical stress relaxation properties, leading to a reduction in product reliability). In contrast, silicone-based adhesive films are typically highly heat resistant with low elasticity, but until now, silicone films with adequate adhesion and workability, which are also easy to produce, have remained elusive.

The applicants of the present invention have previously proposed an improved adhesive silicone elastomer film (see JP2000-234060A; U.S. counter part: U.S. Pat. No. 6,312, 553), but under extreme conditions, such as a heat cycle test between −55° C. and 150° C., the adhesion was still somewhat inadequate, and peeling as a result of poor adhesion was observed on occasion. Furthermore, in JP2003-238808A and JP2003-238809A (their US counterpart: U.S. Ser. No. 10/366,357, i.e., US2003-0190484A), the time taken during die bonding for the required adhesion to manifest was problematic. Accordingly, a film in which adhesion manifests more rapidly during die bonding has been keenly sought. In addition, the preparation of adhesive silicone elastomer films requires advanced technology and expensive apparatus for the molding process, and accordingly, a simpler preparation has been keenly sought for the production of semiconductor products.

SUMMARY OF THE INVENTION

In view of the problems of the prior art described above, an object of the present invention is to provide an adhesive silicone elastomer film that enables a rationalization of the usage process, and displays low elasticity, good heat resistance, powerful adhesion and excellent workability; a radiation curing silicone rubber composition which is suitable to production of said adhesive silicone elastomer film; a structural body, such as a semiconductor device, using the composition; and a method of producing the structural body.

A first aspect of the present invention provides a radiation curing silicone rubber composition comprising:

(a) 5 to 100 parts by weight of an organohydrogenpolysiloxane containing at least one group selected from the group consisting of acryloyl groups and methacryloyl groups, and at least one hydrosilyl group within each molecule;

(b) 95 to 0 parts by weight of a fluid organopolysiloxane with at least two groups which are each selected from the group consisting of acryloyl groups and methacryloyl groups within each molecule, and with no hydrosilyl groups, (wherein, the combined weight of the component (a) and the component (b) is 100 parts by weight);

(c) 0 to 30 parts by weight of at least one compound selected from the group consisting of alkoxysilanes, partial hydrolysis-condensation products of alkoxysilanes, organosilane-modified isocyanurates and organosiloxane-modified isocyanurates;

(d) an effective quantity of a radiation sensitizer; and (e) an effective quantity of a platinum group metal-based catalyst, wherein the quantity of the component (c), relative to the 100 parts by weight of the combination of the component (a) and the component (b), is preferably within a range from 0.1 to 30 parts by weight.

A second aspect of the present invention provides an adhesive silicone elastomer film comprising a radiation-cured product of the composition described above, in particular, an adhesive silicone elastomer film produced by molding the composition described above into a film, and then curing the thus produced film by irradiation with radiation.

A third aspect of the present invention provides a silicone elastomer film coated body produced by covering a portion of, or all of, a substrate with the aforementioned adhesive silicone elastomer film, and subsequently applying heat to bond the film to the substrate.

A fourth aspect of the present invention provides a structural body comprising a first substrate, a second substrate, and an adhesive layer binding the both substrates to each other, said adhesive layer comprising a cured product of the composition described above. Examples of the structural body include a structural body produced by sandwiching the aforementioned adhesive silicone elastomer film between two substrates, and subsequently applying heat to heat-cure and bond the film to both substrates, thereby bonding the two substrates mutually together. In a typical example, the structural body is a semiconductor device in which either the first substrate or the second substrate is a semiconductor chip, and the remaining substrate is a support for the semiconductor chip, such as a lead frame or a package.

A fifth aspect of the present invention provides a method of producing the structural described above, comprising the steps of molding a radiation curing silicone rubber composition described above into a film on top of a first substrate to form a film type molded body, irradiating said film type molded body with radiation to generate an adhesive elastomer film, adhering a second substrate on top of said elastomer film, and subsequently curing said elastomer film by heat treatment (Method A).

In the fifth aspect above, in the case where the structural body is a semiconductor device, either the first substrate or the second substrate is a semiconductor chip, and the remaining substrate is a support for the semiconductor chip, such as a lead frame or a package.

A sixth aspect of the present invention provides a method of producing the structural body described above, comprising the steps of sandwiching said adhesive silicone elastomer film described above between a first substrate and a second substrate, and subsequently applying heat to heat-cure and bond said film to both substrates, thereby bonding said two substrates mutually together.

In the sixth aspect above, in the case where the structural body is a semiconductor device, either the first substrate or the second substrate is a semiconductor chip, and the remaining substrate is a support for the semiconductor chip, such as a lead frame or a package.

BRIEF DESCRIPTION OF THE DRAWING

In the accompanying drawing, the FIGURE shows a specimen for measuring adhesion under shear.

DETAILED DESCRIPTION OF THE PREFERRED EMBODIMENTS

Figure 1:
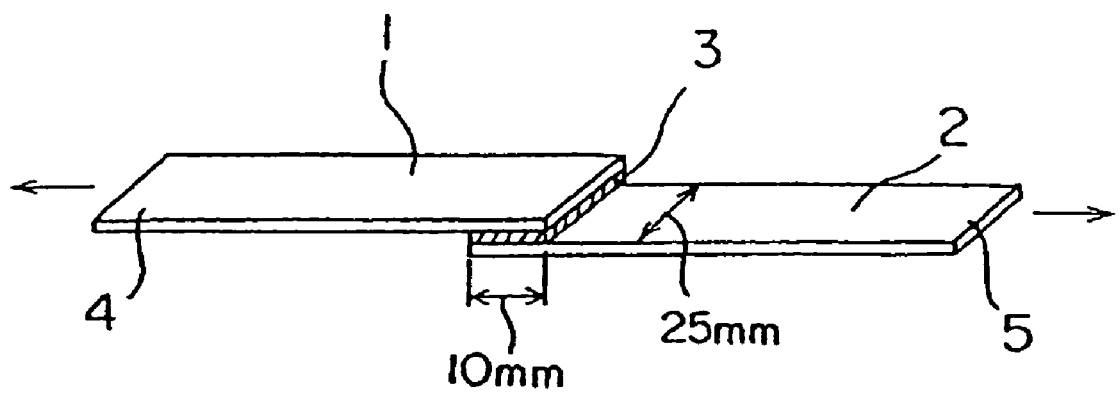

As follows is a more detailed description of the present invention. In the following, "acryloyl" and "methacryloyl", "acrylate" and "methacrylate", and the like are generically termed as "(meth)acryloyl", "(meth)acrylate", and the like.

<Radiation Curing Silicone Rubber Composition>

A radiation curing silicone rubber composition according to the present invention comprises the components (a) to (e) described below (although, the component (c) is an optional component that may be added optionally when required).

[(a) Organohydrogenpolysiloxane]

An organohydrogenpolysiloxane of the component (a), with at least one group selected from the group consisting of acryloyl groups and methacryloyl groups (hereafter, the term "(meth)acryloyl group" is used as a general term encompassing both groups) and at least one hydrosilyl group (namely, SiH group) within each molecule (namely, a (meth) acryloyl group-containing organohydrogenpolysiloxane), is an essential component of the present invention. This molecule comprises at least one, and preferably from 1 to 10, and even more preferably from 2 to 4 (meth)acryloyloxy group-substituted monovalent hydrocarbon groups, including (meth)acryloyloxyalkyl groups such as (meth)acryloyloxyethyl groups, (meth)acryloyloxypropyl groups and (meth)acryloyloxybutyl groups, preferably as substituents bonded to silicon atoms at either one, or two or more terminals of the molecular chain. Furthermore, this molecule also comprises at least one, and preferably from 2 to 200 hydrogen atoms bonded to silicon atoms (namely, hydrosilyl groups represented by the formula SiH) at the molecular chain terminals and/or at non-terminal positions within the molecular chain, and is preferably a straight chain organohydrogenpolysiloxane. The degree of polymerization (or the number of silicon atoms within a molecule) of the component is preferably within a range from 2 to 10,000, and even more preferably from 10 to 1,000, and most preferably from 20 to 200.

Suitable examples of the component (a) include the compounds represented by a general formula (I) shown below:

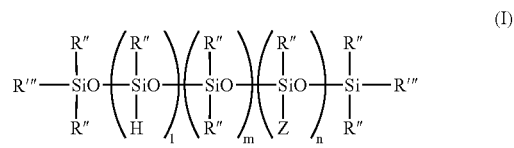

(I)

[wherein, the groups R" represent monovalent hydrocarbon groups, the groups R'" represent hydrogen atoms, monovalent hydrocarbon groups, or (meth)acryloyloxy group-containing organic groups, and Z represents a (meth)acryloyloxy group-containing organic group; and l, m and n are integers that satisfy the requirements $0 \leq l \leq 8,000$, $0 \leq m \leq 8,000$, and $0 \leq n \leq 8$ respectively, although l+m+n is an integer from 1 to 10,000, and when l=0, at least one of the two R'" groups represents a hydrogen atom, and when n=0, at least one of the two R'" groups represents a (meth)acryloyloxy group-containing organic group].

Specific examples of the component (a) include those compounds represented by the formulas shown below:

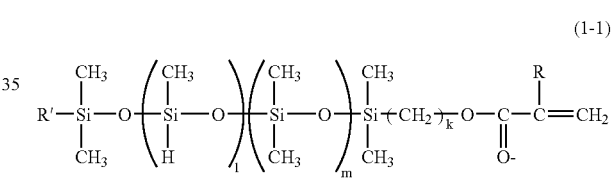

(1-1)

[wherein, R and R' each represent, independently, a hydrogen atom or a methyl group; when R' is a hydrogen atom, l represents an integer that satisfies the requirement $0 \leq l \leq 8,000$, and preferably $1 \leq l \leq 1,000$, and even more preferably $1 \leq l \leq 200$, whereas when R' is a methyl group l represents an integer that satisfies the requirement $1 \leq l \leq 8,000$, and preferably $2 \leq l \leq 1,000$, and even more preferably $2 \leq l \leq 200$; m represents an integer that satisfies the requirement $0 \leq m \leq 8,000$, and preferably $0 \leq m \leq 1,000$, and even more preferably $0 \leq m \leq 200$; the sum of l+m represents an integer from 1 to 10,000, and preferably from 10 to 8,000, and even more preferably from 20 to 200; and k represents an integer from 1 to 4, and preferably from 1 to 3, and most preferably 2];

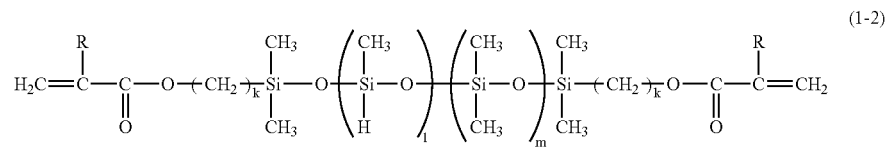

(1-2)

[wherein, each R represents, independently, a hydrogen atom or a methyl group; l represents an integer that satisfies the requirement $1 \leq l \leq 8{,}000$, and preferably $2 \leq l \leq 1{,}000$, and even more preferably $2 \leq l \leq 200$; m represents an integer that satisfies the requirement $0 \leq m \leq 8{,}000$, and preferably $0 \leq m \leq 1{,}000$, and even more preferably $0 \leq m \leq 200$; the sum of l+m represents an integer from 1 to 10,000, and preferably from 10 to 8,000, and even more preferably from 20 to 200; and k represents an integer from 1 to 4, and preferably from 1 to 3, and most preferably 2];

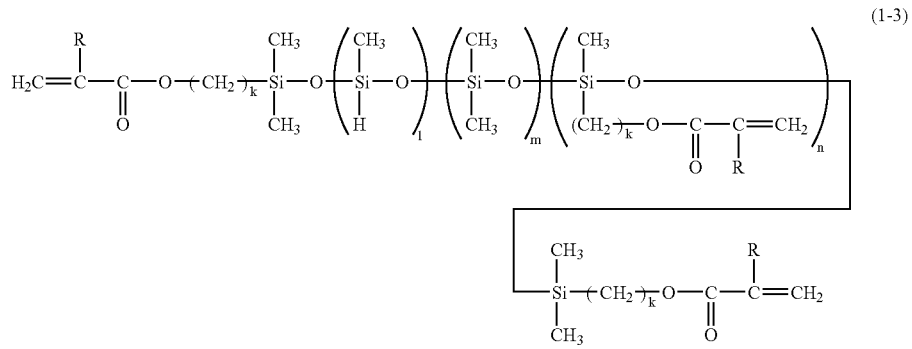

(1-3)

[wherein, the definition for R, and the preferred ranges for k, l and m are as defined in relation to the formula (1-2); n represents an integer that satisfies the requirement $1 \leq n \leq 8$, and preferably $1 \leq n \leq 5$, and even more preferably $1 \leq n \leq 3$; and the sum of l+m+n represents an integer from 1 to 10,000, and preferably from 10 to 8,000, and even more preferably from 20 to 200];

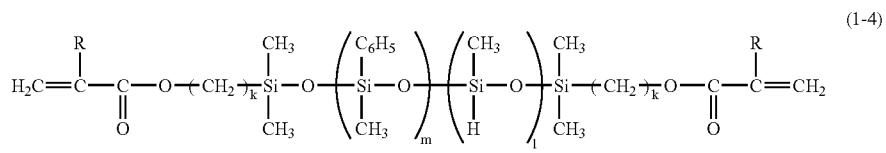

(1-4)

[wherein, the definition for R, and the preferred ranges for k, l and m are as defined in relation to the formula (1-2)].

The (meth)acryloyloxy group-containing organohydrogenpolysiloxanes represented by the above formulas can be used singularly, or in combinations of two or more compounds.

The component (a) can be produced, for example, by conducting a room temperature equilibration reaction of a diorganocyclosiloxane oligomer such as octamethylcyclotetrasiloxane, an organohydrogencyclosiloxane oligomer such as tetramethylcyclotetrasiloxane, and a (meth)acryloyloxyalkyldiorganodisiloxane that can become a terminal group such as 1,3-bis(acryloyloxymethyl)-1,1,3,3-tetramethyldisiloxane, in the presence of a strong acid catalyst such as trifluorosulfonic acid.

Furthermore, although compounds of the component (a) need only comprise one or more (meth)acryloyl groups in each molecule, in those cases in which a composition of the present invention does not include a component (b) described below, the component (a) should preferably comprise at least two (meth)acryloyl groups within each molecule.

The quantity of the component (a) within a composition of the present invention is within a range from 5 to 100 parts by weight, and preferably from 20 to 100 parts by weight, and even more preferably from 20 to 90 parts by weight (wherein, the combined weight of the component (a) and the component (b) described below is 100 parts by weight).

Because a composition of the present invention comprises an organohydrogenpolysiloxane of the component (a), when an adhesive silicone elastomer film, which has been molded on top of a substrate by the method described below, is either adhered to any of a variety of substrates and then subjected to heat treatment, or alternatively subjected to high temperature thermocompression bonding to a substrate, two SiH bonds within the component (a) can undergo an oxidation polymerization and form a Si—O—Si linkage, or alternatively the Si—H bonds can undergo reaction with the plurality of —OH groups and —H groups (active hydrogen groups) which exist on a typical substrate surface and form chemical bonds (such as —OSi— or —Si—Si— bonds), and consequently a powerful adhesion can be achieved between the substrate and the film. In order to ensure good adhesive strength, the temperature for the thermocompression bonding must be at least 120° C., and preferably at least 150° C., and even more preferably 160° C. or greater.

[(b) Fluid Organopolysiloxane]

Suitable examples of the fluid organopolysiloxane of the component (b), with at least two (meth)acryloyl groups within each molecule, and with no hydrosilyl groups, include compounds represented by the general formula (II) shown below:

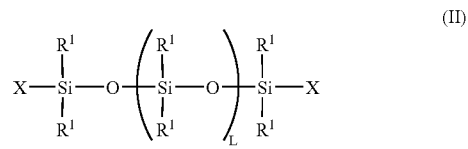

(II)

[wherein, each $R^1$ represents, independently, an unsubstituted or substituted monovalent hydrocarbon group of 1 to 9 carbon atoms, L is an integer that satisfies the requirement $8 \leq L \leq 10{,}000$, and preferably $18 \leq L \leq 1{,}000$, and even more preferably $48 \leq L \leq 500$, each X group represents, independently, a group represented by a general formula (III) shown below:

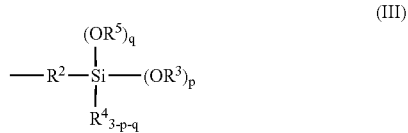

(wherein, $R^2$ represents a bivalent hydrocarbon group of 2 to 4 carbon atoms or an oxygen atom, $R^3$ represents a monovalent organic group of 4 to 25 carbon atoms comprising 1 to 3 (meth)acryloyl groups, each $R^4$ represents, independently, an unsubstituted or substituted monovalent hydrocarbon group of 1 to 9 carbon atoms, each $R^5$ represents, independently, an unsubstituted or substituted monovalent hydrocarbon group of 1 to 18 carbon atoms, and p is an integer that satisfies the requirement $1 \leq p \leq 3$, q is an integer that satisfies the requirement $0 \leq q \leq 2$, and the sum p+q is an integer from 1 to 3)].

The number of (meth)acryloyl groups within each molecule of the organopolysiloxane represented by the general formula (II) is preferably at least three, and even more preferably four or greater.

In the general formula (II) described above, $R^1$ is preferably a substituted or unsubstituted monovalent hydrocarbon group of 1 to 6 carbon atoms. Specific examples of this monovalent hydrocarbon group include alkyl groups such as methyl groups, ethyl groups, propyl groups, isopropyl groups, butyl groups, isobutyl groups, tert-butyl groups, pentyl groups, hexyl groups, heptyl groups, 2-ethylhexyl groups, octyl groups and nonyl groups; cycloalkyl groups such as cyclohexyl groups and cycloheptyl groups; alkenyl groups such as vinyl groups, allyl groups, propenyl groups, isopropenyl groups, butenyl groups and hexenyl groups; aryl groups such as phenyl groups and tolyl groups; aralkyl groups including benzyl groups, phenylethyl groups and phenylpropyl groups such as 3-phenylpropyl groups; as well as groups in which at least a portion of the hydrogen atoms bonded to carbon atoms within the aforementioned groups have been substituted with substituents such as halogen atoms or cyano groups, including chloromethyl groups, cyanoethyl groups and trifluoropropyl groups such as 3,3, 3-trifluoropropyl groups.

However, compounds in which methyl groups account for at least 50 mol %, and preferably at least 80 mol % (namely, 80 to 100 mol %), and most preferably 90 mol % or greater (namely, 90 to 100 mol %), of the $R^1$ groups are preferred, and compounds in which phenyl groups account for no more than 25 mol %, and preferably no more than 10 mol % (namely, 0 to 10 mol %) of the $R^1$ groups are particularly desirable.

In a preferred embodiment of the present invention, at least 50 mol % of the $R^1$ groups are methyl groups and no more than 25 mol % are phenyl groups, and compounds in which at least 80 mol % (namely, 80 to 100 mol %), and even more preferably 90 mol % or greater (namely, 90 to 100 mol %) of the $R^1$ groups are methyl groups, and no more than 10 mol % (namely, 0 to 10 mol %) are phenyl groups are particularly desirable.

The $R^2$ group in the general formula (III) above is either an oxygen atom or a bivalent hydrocarbon group, although from the viewpoint of stability relative to hydrolysis, is preferably a bivalent hydrocarbon group. Specific examples of this bivalent hydrocarbon group include alkylene groups of 2 to 4 carbon atoms such as ethylene groups, propylene groups, methylethylene groups and tetramethylene groups, although ethylene groups are preferred.

In addition, the $R^3$ group in the general formula (III) above comprises from 1 to 3, and preferably from 2 to 3, and most preferably 3 (meth)acryloyl groups (particularly as (meth)acryloyloxy groups). Specific examples of the (meth) acryloyl groups are represented by the formulas $CH_2$=CHCO— and $CH_2$=C($CH_3$)CO—. Specific examples of the $R^3$ group include alkyl groups of 1 to 10, and preferably from 2 to 6 carbon atoms substituted with 1 to 3 acryloyloxy groups or methacryloyloxy groups such as $CH_2$=CHCOOCH$_2$CH$_2$—, [$CH_2$=C($CH_3$)COOCH$_2$]$_3$C—CH$_2$—, ($CH_2$=CHCOOCH$_2$)$_3$C—CH$_2$— and ($CH_2$=CHCOOCH$_2$)$_2$C($C_2H_5$)CH$_2$—. Preferred structures include $CH_2$=CHCOOCH$_2$CH$_2$—, [$CH_2$=C($CH_3$)COOCH$_2$]$_3$C—CH$_2$—, ($CH_2$=CHCOOCH$_2$)$_3$C—CH$_2$—, ($CH_2$=CHCOOCH$_2$)$_2$C($C_2H_5$)CH$_2$—, $CH_2$=C($CH_3$)COOCH$_2$CH$_2$—, [$CH_2$=C($CH_3$)COOCH$_2$]$_2$C($C_2H_5$)—CH$_2$— and ($CH_2$=CHCOOCH$_2$)[$CH_2$=C($CH_3$)COOCH$_2$]CH—, and the most preferred structures are [$CH_2$=C($CH_3$)COOCH$_2$]$_3$C—CH$_2$—, ($CH_2$=CHCOOCH$_2$)$_3$C—CH$_2$—, ($CH_2$=CHCOOCH$_2$)$_2$C($C_2H_5$)CH$_2$—, and ($CH_2$=CHCOOCH$_2$)[$CH_2$=C($CH_3$)COOCH$_2$]CH—.

The $R^4$ group in the general formula (III) above is a substituted or unsubstituted monovalent hydrocarbon group of 1 to 9 carbon atoms, and preferably 1 to 6 carbon atoms. Specific examples of the $R^4$ group include those groups listed above in relation to the $R^1$ group of the general formula (II), and in the same manner as the $R^1$ group, compounds in which methyl groups account for at least 50 mol %, and preferably at least 80 mol % (namely, 80 to 100 mol %), and most preferably 90 mol % or greater (namely, 90 to 100 mol %), of the $R^4$ groups are preferred, and compounds in which phenyl groups account for no more than 25 mol %, and preferably no more than 10 mol % (namely, 0 to 10 mol %) of the $R^4$ groups are particularly desirable.

In a preferred embodiment of the present invention, at least 50 mol % of the $R^4$ groups are methyl groups and no more than 25 mol % are phenyl groups, and compounds in which at least 80 mol % (namely, 80 to 100 mol %), and even more preferably 90 mol % or greater (namely, 90 to 100 mol %) of the $R^4$ groups are methyl groups, and no more than 10 mol % (namely, 0 to 10 mol %) are phenyl groups are particularly desirable.

The $R^5$ group in the general formula (III) is a substituted or unsubstituted monovalent hydrocarbon group of 1 to 18 carbon atoms, and preferably 1 to 8 carbon atoms. Specific examples of the $R^5$ group include alkyl groups such as methyl groups, ethyl groups, propyl groups, isopropyl groups, butyl groups, tert-butyl groups, pentyl groups, and neopentyl groups; cycloalkyl groups such as cyclohexyl groups and cycloheptyl groups; aryl groups such as phenyl groups and tolyl groups; and alkenyl groups such as allyl groups, propenyl groups and butenyl groups. The $R^5$ group preferably excludes aliphatic unsaturated groups such as alkenyl groups, and most preferably includes an alkyl group, cycloalkyl group and aryl group.

Specific examples of the organopolysiloxane represented by the general formula (II) include the formulas shown below.

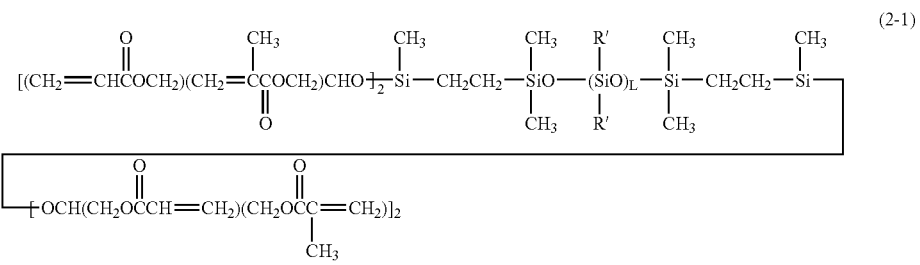
(2-1)
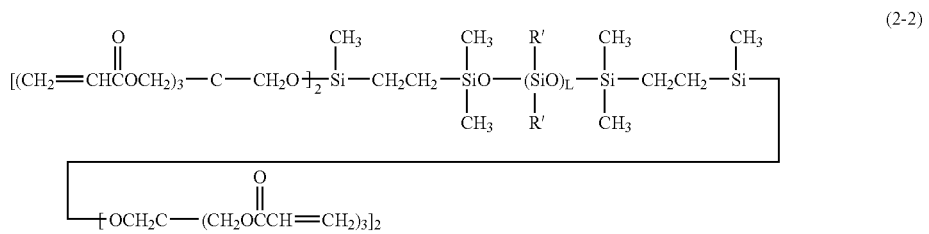
(2-2)
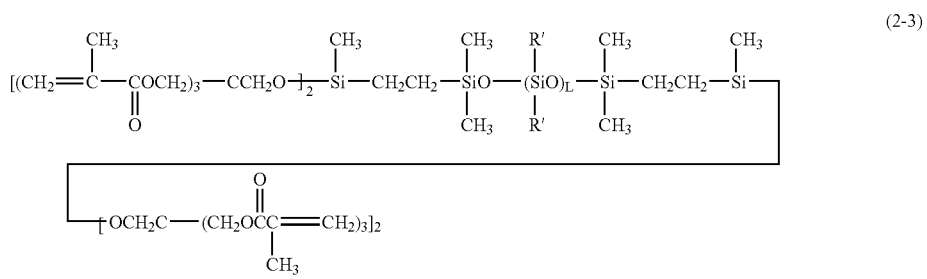
(2-3)
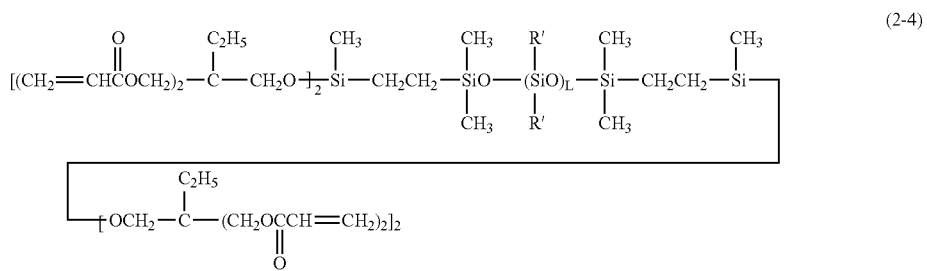
(2-4)
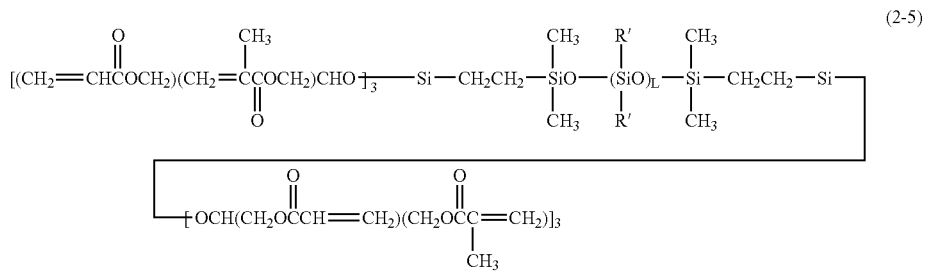
(2-5)
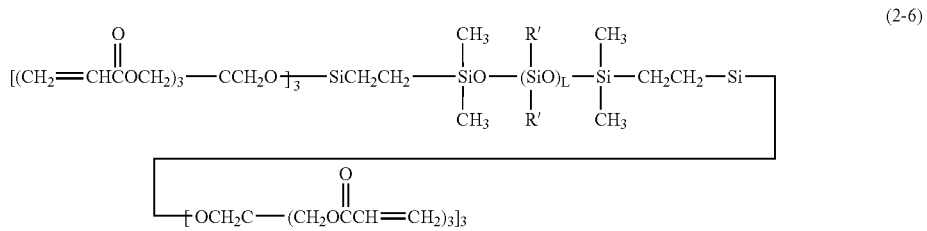
(2-6)

-continued
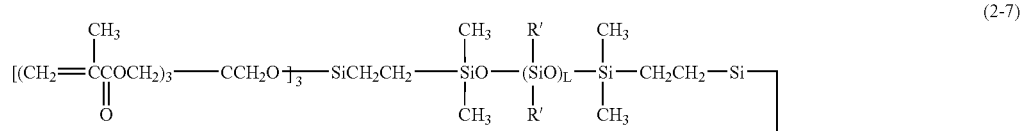
(2-7)
(2-8)
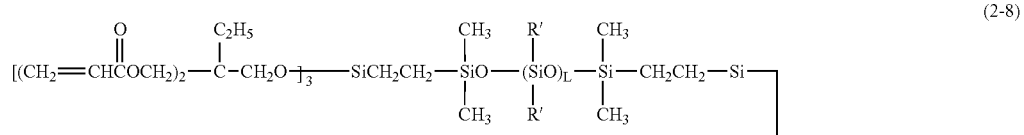
(2-9)
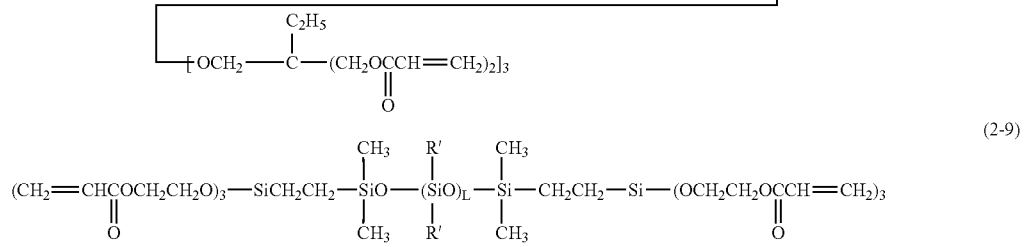
(2-10)
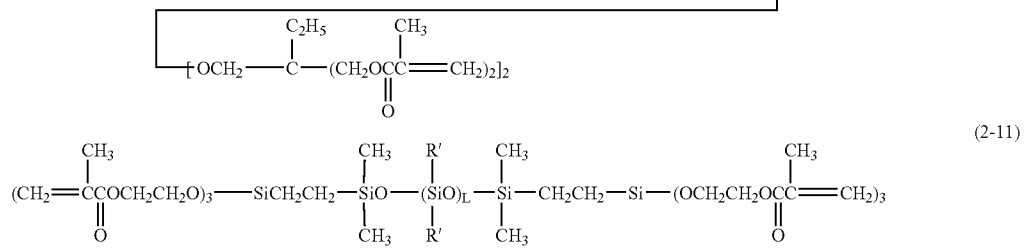
(2-11)
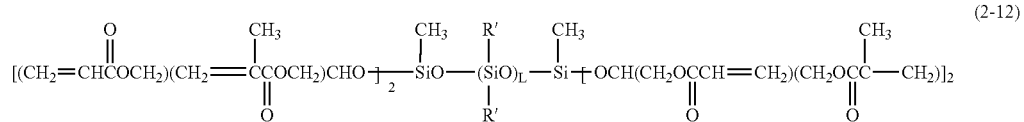
(2-12)
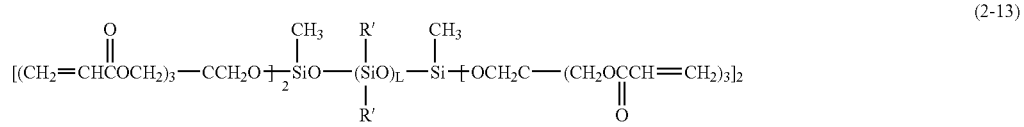
(2-13)
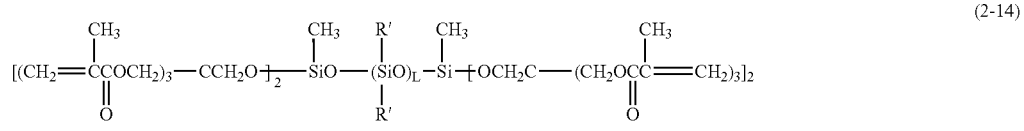
(2-14)
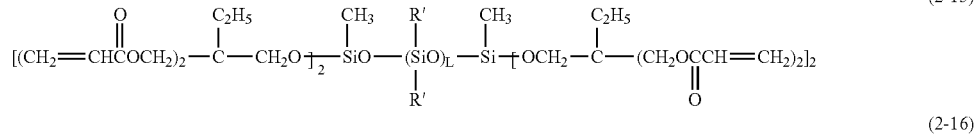
(2-15)
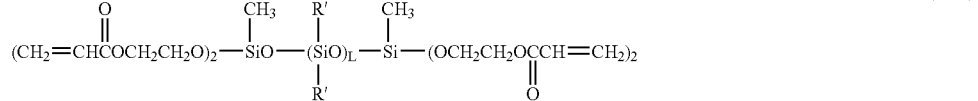
(2-16)

-continued

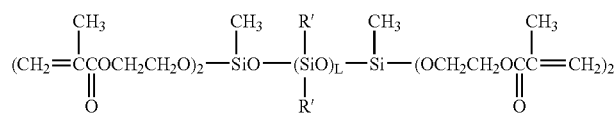
(2-17)

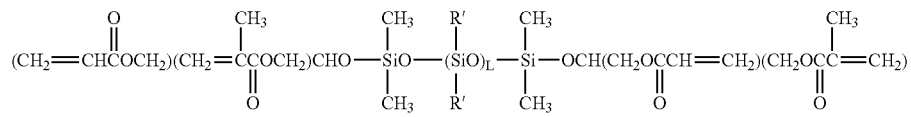
(2-18)

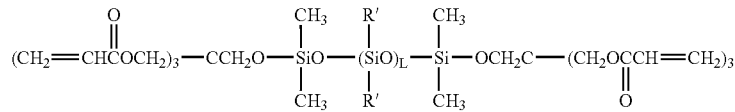
(2-19)

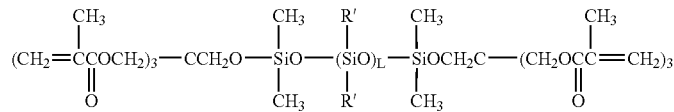
(2-20)

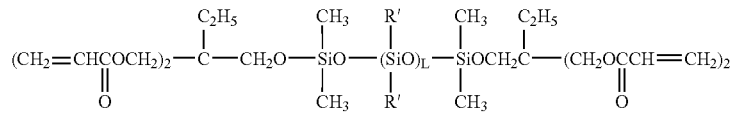
(2-21)

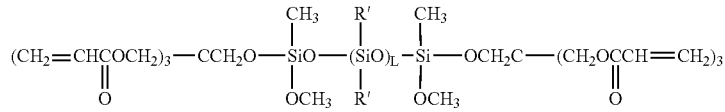
(2-22)

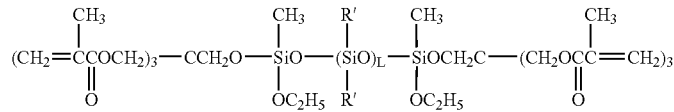
(2-23)

[wherein, R' represents a methyl group, a phenyl group or a 3,3,3-trifluoropropyl group, and L is as defined above (namely, as per the definition relating to the general formula (II))].

An organopolysiloxane of the component (b) represented by the aforementioned general formula (II) comprises —OR$^3$ groups as radiation sensitive groups (in other words, comprises from 2 to 18, and preferably from 3 to 12, and even more preferably from 4 to 12 (meth)acryloyl groups within each molecule), and consequently is easily cured by irradiation with radiation such as ultraviolet light. This organopolysiloxane may utilize either a single compound or a combination of two or more different compounds.

An organopolysiloxane of the general formula (II) can be produced by, for example, a dehydrochlorination reaction of the corresponding chlorosiloxane and a (meth)acryloyl functional compound with an active hydroxyl group. Examples of this chlorosiloxane include those compounds represented by the formulas shown below.

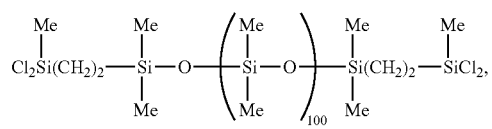

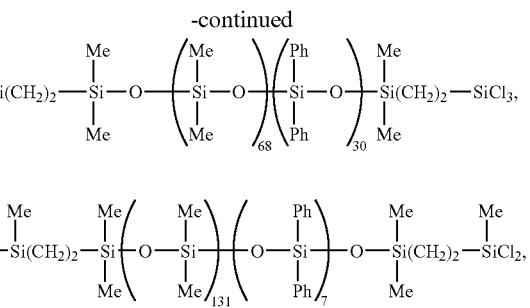

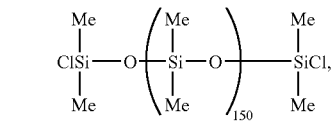

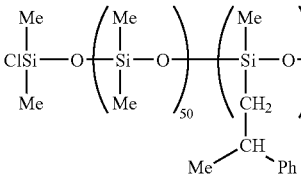

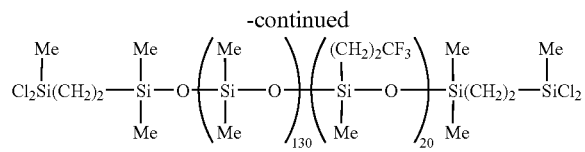

(wherein, Me represents a methyl group, and Ph represents a phenyl group).

Examples of the aforementioned (meth)acryloyl functional compound with an active hydroxyl group include 2-hydroxyethyl(meth)acrylate, trimethylolpropanedi(meth)acrylate, pentaerythritoltri(meth)acrylate and 2-hydroxy-1-acryloyloxy-3-methacryloyloxypropane. Of these, taking into consideration the fact that the target organopolysiloxane preferably comprises groups containing from 2 to 9 (meth)acryloyl groups bonded to the silicon atoms at each molecular chain terminal, trimethylolpropanedi(meth)acrylate, pentaerythritoltri(meth)acrylate and 2-hydroxy-1-acryloyloxy-3-methacryloyloxypropane are preferred, and pentaerythritoltri(meth)acrylate is particularly desirable.

The quantity of the component (b) within a composition of the present invention is within a range from 95 to 0 parts by weight, and preferably from 80 to 0 parts by weight, and even more preferably from 80 to 10 parts by weight (wherein, the combined weight of the component (a) and the component (b) described above is 100 parts by weight).

[(c) Alkoxysilane]

The alkoxysilane or partial hydrolysis-condensation product of an alkoxysilane (namely, an organopolysiloxane (oligomer) with at least one, and preferably two or more residual alkoxy groups within each molecule) of the component (c) is an optional component that can be added, when required, to improve the adhesion to the substrate. Specific examples of this component (c) include the compounds listed below.

Namely, tetraalkoxysilanes such as tetramethoxysilane, tetraethoxysilane, tetrapropoxysilane, tetra(isopropoxy)silane, tetrabutoxysilane, tetra(isobutoxy)silane and tetra(tert-butoxy)silane; trialkoxyhydrogensilanes such as trimethoxysilane, triethoxysilane, tripropoxysilane, tri(isopropoxy)silane, tributoxysilane, tri(isobutoxy)silane and tri(tert-butoxy)silane; organotrialkoxysilanes with a lower alkyl group or an aryl group or the like as a monovalent hydrocarbon group such as methyltrimethoxysilane, methyltriethoxysilane, ethyltrimethoxysilane, ethyltriethoxysilane, vinyltrimethoxysilane, vinyltriethoxysilane, phenyltrimethoxysilane and phenyltriethoxysilane; as well as partial hydrolysis-condensation products of these alkoxysilanes (namely, organopolysiloxanes (oligomers) with at least one, and preferably two or more residual alkoxy groups within each molecule); and the organopolysiloxanes shown below:

(wherein, n is an integer that satisfies the requirement $0 \leq n \leq 100$, and preferably $0 \leq n \leq 50$).

In addition, the organosilane or organosiloxane-modified isocyanurates of the component (c) can be synthesized by performing an addition reaction between an isocyanurate with 1 to 3 alkenyl groups such as vinyl groups or allyl groups (such as triallyl isocyanurate), and an organosilane or organosiloxane containing SiH bonds, in the presence of a platinum-based catalyst (see JP45-23354B; US counterparts: U.S. Pat. Nos. 3,821,218 and 3,517,001). Examples of this type of organosilane or organosiloxane-modified isocyanurate include isocyanurates containing from 1 to 3 trialkoxysilyl-substituted alkyl groups such as γ-trimethoxysilylpropyl groups or γ-triethoxysilylpropyl groups within each molecule, as well as compounds in which these alkoxysilyl groups have undergone hydrolysis-condensation (namely, siloxane-modified isocyanurates). Specific examples include the compounds represented by the formulas shown below:

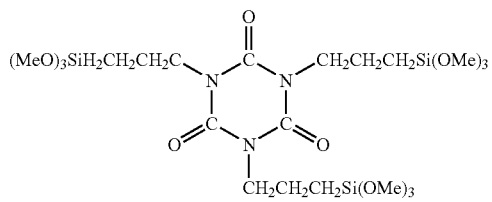

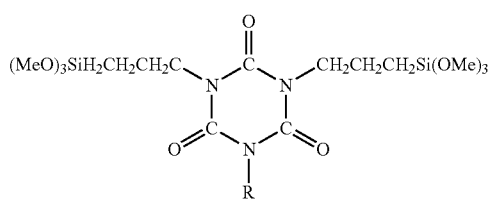

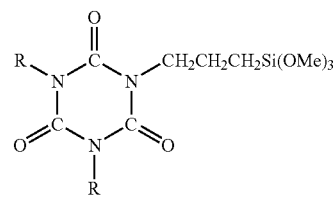

(wherein, each R represents, independently, a hydrogen atom, an alkyl group, an aralkyl group, a lower alkenyl group or an aryl group).

This component (c) can be used singularly, or in combinations of two or more different compounds.

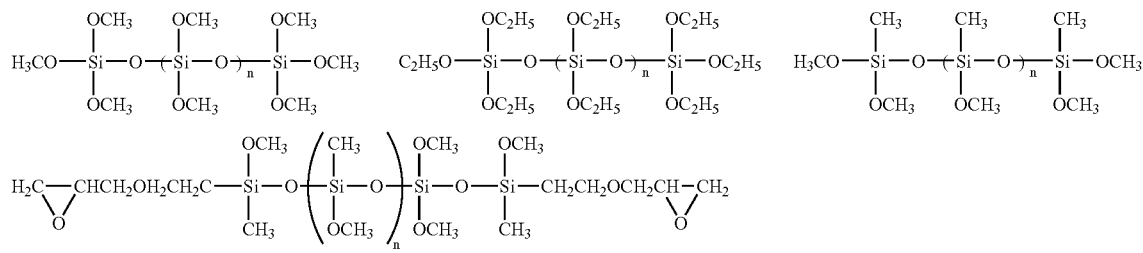

The quantity of the component (c) within a composition of the present invention is within a range from 0 to 30 parts by weight, and preferably from 0.1 to 30 parts by weight, and even more preferably from 0.5 to 20 parts by weight, per 100 parts by weight of the combined weight of the component (a) and the component (b). Including the component (c) in a composition of the present invention is effective in improving the adhesive strength of the adhesive elastomer film under low temperature conditions.

[(d) Radiation Sensitizer]

There are no particular restrictions on the radiation sensitizer of the component (d), although benzoyl compounds (or phenylketone compounds) such as benzophenone are preferred, and specific examples include benzoyl compounds (or phenylketone compounds) with a hydroxy group on the α-position carbon atom of a carbonyl group such as 1-hydroxycyclohexylphenylketone, 2-hydroxy-2-methyl-1-phenylpropan-1-one, and 1-(4-isopropylphenyl)-2-hydroxy-2-methylpropan-1-one; organophosphine oxide compounds such as 2,4,6-trimethylbenzoyldiphenylphosphine oxide, bisacylmonoorganophosphine oxide and bis(2,6-dimethoxybenzoyl)-2,4,4-trimethylpentylphosphine oxide; as well as benzoin ether compounds such as isobutylbenzoin ether; ketal compounds such as acetophenonediethylketal; thioxanthone-based compounds; and acetophenone-based compounds. These compounds may be used singularly, or in combinations of two or more different compounds.

There are no particular restrictions on the quantity of the component (d) within a composition of the present invention, which need only be an effective quantity for ensuring curing of the composition of the present invention under irradiation with radiation such as ultraviolet light, although the quantity is typically within a range from 0.5 to 10 parts by weight, and preferably from 1.0 to 5.0 parts by weight, per 100 parts by weight of the combined weight of the component (a) and the component(b).

[(e) Platinum Group Metal-Based Catalyst]

The platinum group metal-based catalyst of the component (e) is a catalyst which, on heating, promotes the oxidation polymerization of Si—H bonds within the component (a), and the dehydrocondensation reaction between these Si—H groups and the groups (such as —OH groups and —H groups (active hydrogen groups)) which exist at the substrate surface.

(Meth)acryloyl groups, which are radiation sensitive, contained in the components (a) and (b) undergo polymerization and crosslinking upon irradiation with radiation such as ultraviolet radiation, resulting in formation of an elastomeric film. After the irradiation, Si—H groups deriving from the component (a) remain in the crosslinked film, and undergo oxidation polymerization upon the subsequent heat treatment, thus increasing the crosslinking density in the film, and simultaneously a part of Si—H groups undergo dehydrocondensation with Si—OH groups present on surfaces of a substrate to form siloxane bonding (—O—Si—), enhancing adhesion of the film with the substrate.

This platinum group metal-based catalyst can utilize known hydrosilylation reaction catalysts. Specific examples of these catalysts include platinum group simple metals such as platinum (including platinum black), rhodium and palladium; platinum chlorides such as $H_2PtCl_4 \cdot nH_2O$, $H_2PtCl_6 \cdot nH_2O$, $NaHPtCl_6 \cdot nH2O$, $KHPtCl_6 \cdot nH_2O$, $Na_2PtCl_6 \cdot nH_2O$, $K_2PtCl_4 \cdot nH_2O$, $PtCl_4 \cdot nH_2O$, $PtCl_2$ and $Na_2HPtCl_4 \cdot nH_2O$ (wherein, n represents an integer from 0 to 6, and preferably either 0 or 6); chloroplatinic acid and chloroplatinates; alcohol-modified chloroplatinic acid (see U.S. Pat. No. 3,220,972); complexes of chloroplatinic acid and olefins (see U.S. Pat. Nos. 3,159,601, 3,159,662 and 3,775,452); a platinum group metal such as platinum black or palladium supported on a carrier such as alumina, silica or carbon; rhodium-olefin complexes; chlorotris(triphenylphosphine)rhodium (Wilkinson's catalyst); and complexes of platinum chloride, chloroplatinic acid or a chloroplatinate with a vinyl group-containing siloxane and particularly a vinyl group-containing cyclic siloxane. These catalysts can be used singularly, or in combinations of two or more different materials.

There are no particular restrictions on the quantity of the component (e) within a composition of the present invention, which need only be an effective catalytic quantity, although a typical quantity, calculated as a weight referenced quantity of platinum group metal atoms, is within a range from 0.01 to 2,000 ppm, and preferably from 0.1 to 500 ppm, relative to the combined weight of the aforementioned component (a) and component (b).

[(f) Reaction Retarding Agent]

A composition of the present invention, comprising the components (a) to (e) described above, preferably also comprises, as an optional component that is added as required, a reaction retarding agent (f) that suppresses the room temperature curing reaction of the composition of the present invention during storage or transport, thereby ensuring that the composition remains usable for a satisfactory length of time. Suitable examples of this component include ionic compounds of heavy metals (see U.S. Pat. No. 3,532,649), as well as any of the known materials typically used as addition reaction retarding agents for hydrosilylation reactions.

Specific examples include polysiloxanes comprising $CH_2$=CHRSiO units (wherein, R is a monovalent hydrocarbon group containing no aliphatic unsaturated double bonds) (see JP48-10947B; US counterpart: U.S. Pat. No. 3,699,073), and acetylene compounds such as acetylene alcohols (such as 1-ethynyl-1-cyclohexanol and 3-methyl-1-butyn-3-ol) (see U.S. Pat. No. 3,445,420). Of these, acetylene compounds are particularly preferred. The descriptions of the publications are incorporated herein by reference.

There are no particular restrictions on the quantity of the component (f) added to a composition of the present invention, which need only be an effective quantity, although the quantity typically provides from 0 to 1000 mols, and preferably from 1 to 1000 mols, and even more preferably from 10 to 500 mols, and most preferably from 30 to 300 mols, per 1 mol of platinum group metal atoms within the aforementioned component (e). If the quantity of the component (f) is too small, then the storage stability of the composition of the present invention may deteriorate, leading to a decrease in the adhesiveness during prolonged storage, whereas in contrast, if the quantity is too large, the speed of adhesion of the composition may slow markedly.

[Other Components]

In addition to the components (a) to (f) described above (wherein the component (c) and the component (f) are optional components), other additives may also be added to a composition of the present invention, provided such addition is restricted to a quantity which does not impair the curability and the adhesive performance of a composition of the present invention.

In those cases where the composition is used to form a thin film coating, fillers such as fumed silica, quartz powder, titanium oxide, calcium carbonate, and carbon black may be added for the purposes of improving the composition workability, reducing the thermal expansion of the cured product, improving properties such as the thermal stability, weather resistance, chemical resistance, flame retardancy or mechanical strength, and reducing the gas permeability, provided the quantity of filler added does not impair the film formation properties. In addition, in order to enable application of a composition of the present invention to spin coating or screen printing methods, a volatile organic solvent such as toluene, xylene or a low molecular weight siloxane (such as dimethylsilicone fluid) may be added, if required, to adjust the viscosity of the composition to the desired level.

<Adhesive Silicone Elastomer Film>

The adhesive silicone elastomer film according to the present invention can be obtained by forming the radiation curing silicone rubber composition described above into a film, and subsequently curing the film by irradiation with radiation. The composition is in a state of paste, and therefore can be formed continuously by means of commercially available coaters. Conditions of irradiation with radiation are as described below. The inside of an irradiation apparatus is preferably cooled with fans or the like in order to avoid influence by heat generation. The adhesive silicone elastomer film includes sheets in shape. The film has a thickness of typically 5 to 1,000 μm, preferably 10 to 500 μm, more preferably 20 to 200 μm.

<Production of Coated Body>

The coated body according to the present invention can be produced by covering a portion of, or all of, a substrate with the adhesive silicone elastomer film obtained as described above, and subsequently applying heat to bond said film to said substrate. The heat treatment is carried out preferably at 80 to 250° C., more preferably at 100 to 200° C. Examples of substrates include those formed from metals such as Si, Al, Cu, Ni, Cr, Au, Ag and other metals, as well as substrates formed from epoxy resins, bakelite, polyimides, polyesters and silicone resins and the like.

<Structural Body and Production Thereof>

The structural body according to the present invention comprises a first substrate, a second substrate, and an adhesive layer present between both substrates as described above.

Examples of substrates include those formed of metals such as Si, Al, Cu, Ni, Cr, Au, Ag and other metals, as well as substrates formed of organic resins such as epoxy resins, bakelite, polyimides, polyesters and silicone resins and the like. If required, the surface of the substrate may be coated with a silicon oxide film, a photoresist film, a copper plating film or a gold plating film.

In the case where the structural body is a semiconductor devices, either the first substrate or the second substrate is a semiconductor chip, and the remaining substrate is a support therefor, such as e.g. lead frames and packages. The substrate as the support may be formed of materials such as, for example, metals such as Si, Al, Cu, Ni, Cr, Au, Ag and other metals, as well as organic resins such as epoxy resins, bakelite, polyimides, polyesters and silicone resins and the like. The semiconductor chip is comprised of a semiconductor such as silicon, GaAs, CdTe, Ge, or SiC, and has elements, including transistors, diodes, ICs and LSIs. If required, the surface of the substrate may be coated with a silicon oxide film, a photoresist film, a copper plating film or a gold plating film.

-Method A-

The Method A for producing the structural body according to the present invention is described below in respect of an example in which the structural body is a semiconductor device.

The method for production of the semiconductor device comprises the steps of:

(1) molding a radiation-curable silicone rubber composition described above into a film on top of the surface of the first substrate, (2) irradiating the thus produced film with radiation to form an adhesive elastomer film, (3) adhering the second substrate on top of the elastomer film, normally under pressure, to form a precursor-structural body, and (4) subjecting the precursor-structural body thus obtained to heat treatment simultaneously at or following the step (3) above, to heat cure the elastomer film, thereby yielding a semiconductor device in which the two substrates are bonded mutually together via an adhesive layer formed of the cured product of the silicone elastomer film.

Each step of the method above is described below in more detail.

[(1) Film Type Molded Body Formation Step]

The first substrate may be either a semiconductor chip or a support therefor.

There are no particular restrictions on the method used to mold the composition of the present invention into a film on top of the first substrate surface, and application using any commercially available coater is suitable, although spin coating methods and screen printing methods are preferred. Spin coating enables a film type molded body to be formed efficiently, with uniform thickness, across the entire surface of a substrate with flat surface like, e.g., wafer substrates, in a similar manner to the application of a resist. Furthermore, screen printing also enables the formation of a film type molded body of uniform thickness, and if necessary, also enables the formation of a molded body of a specific shape within one area of the substrate.

In those cases where spin coating is employed, the viscosity of the composition of the present invention is preferably comparatively lower, and is typically adjusted to a viscosity at 25° C. within a range from 0.1 to 10 Pa·s, and preferably from 0.2 to 8 Pa·s, and even more preferably from 0.5 to 5 Pa·s.

In those cases where screen printing is employed, the viscosity of the composition of the present invention is preferably comparatively higher, and is typically adjusted to a viscosity at 25° C. within a range from 10 to 1,000 Pa·s, and preferably from 20 to 800 Pa·s, and even more preferably from 50 to 500 Pa·s. During screen printing, a metal mask or a mesh mask or the like can also be used.

[(2) Irradiation Step]

Conditions for irradiating the film with radiation are as described below.

[(3) Adhering Step]

The second substrate is adhered normally under pressure onto the top of the adhesive elastomer film produced by the above step (2), yielding a precursor-structural body. In the case of production of a semiconductor device, when a semiconductor chip is used as the first substrate at step (1), a support therefor is used as the second substrate at this step; but when a support is used as the first substrate at step (1), a semiconductor chip is used as the second substrate at this step.

Furthermore, using a commercially available die bonding mounter, a pressure tool with a semiconductor chip mounted thereon can be used to form a precursor-structural body in which either the semiconductor chip or the support is adhered onto the aforementioned silicone elastomer film.

[(4) Heat Curing Step]

By subjecting the precursor-structural body to heat treatment, either simultaneously with the adhering step (3) or following the adhering step (3), the above elastomer film can be cured by heating treatment, enabling the formation of a semiconductor device in which the two substrates are bonded mutually together via an adhesive layer formed of the cured product of the silicone elastomer film.

-Method B-

The structural body according to the present invention can also be produced by putting the adhesive silicone elastomer film which has been radiation-cured beforehand as described above between a first substrate and a second substrate to form a precursor-structural body, and subsequently heating the film, preferably under pressure, to allow it to adhere to both substrates, thereby combining both substrates to each other.

In any of the aspects and embodiments of the present invention, radiation-curing can be normally carried out as described below.

The irradiation with radiation can utilize a commercially available ultraviolet irradiation device (such as a mercury lamp, a high pressure mercury lamp, a metal halide lamp, or a xenon-mercury lamp). The quantity of radiation energy irradiated onto the film or layer of the radiation-curable composition will vary depending on the thickness of the film or layer, but is typically within a range from 200 to 10,000 mJ/cm$^2$, preferably from 400 to 5,000 mJ/cm$^2$, more preferably from 400 to 2,000 mJ/cm$^2$. Furthermore, the illumination intensity is typically within a range from 40 to 1,000 mW/cm$^2$, preferably from 100 to 500 mW/cm$^2$, more preferably from 40 to 200 mW/cm$^2$. In addition, in order to prevent the effects of heat generation, the interior of the irradiation device is preferably cooled with a fan or the like.

The heat treatment for heat curing is typically conducted at a temperature within a range from 80 to 300° C., preferably from 80 to 250° C., more preferably 100 to 250° C., still more preferably from 120 to 240, further still more preferably from 150 to 240° C., and most preferably from 160 to 230° C. The heating device can utilize a commercially available die bonding mounter or the like, for instance.

EXAMPLES

As follows is a more detailed description of the present invention based on a series of examples. In the examples below, the unit "parts" refers to parts by weight, and in the formulas, Me represents a methyl group, Ph represents a phenyl group, and Et represents an ethyl group. Moreover, the (meth)acryloyloxy group-containing organopolysiloxanes of the component (a) and the component (b) described below were synthesized in accordance with the method disclosed in Japanese Laid-open publication (kokai) No. 2000-234060 (i.e., JP2000-234060A). The descriptions of the publication are incorporated herein by reference.

Synthetic Example 1

(a) Synthesis of an Acryloyloxy Group-Containing Methylhydrogenpolysiloxane

In a reaction vessel equipped with a dropping funnel and a stirring device were placed 1776 g of octamethylcyclotetrasiloxane, 360 g of 1,3,5,7-tetramethylcyclotetrasiloxane, and 18 g of 1,3-bis(acryloyloxymethyl)-1,1,3,3-tetramethyldisiloxane, and stirring was conducted to form a uniform mixture. Subsequently, and with constant stirring, 6 g of trifluorosulfonic acid was added dropwise over an approximately 4 hour period at room temperature (25° C.) to effect an equilibration reaction. 144 g of sodium carbonate was then added to neutralize the mixture, which was then filtered. Subsequently, 1000 ml of toluene was added, the reaction solution was washed with hot water, and following the removal of moisture from the reaction solution, 0.2 g of BHT was added as a polymerization inhibitor, and with constant stirring, a strip was conducted at 100° C./30 mmHg, yielding a transparent fluid copolymer of dimethylsiloxane and methylhydrogensiloxane with acryloyloxy groups at both terminals.

Synthetic Example 2

(b) Synthesis of a (meth)acryloyl Group-Containing Organopolysiloxane

In a 1,000 ml reaction vessel equipped with a stirring device, a reflux condenser, a dropping funnel, and a dry air inlet were placed 571 g of a chloroorganopolysiloxane represented by an average formula shown below,

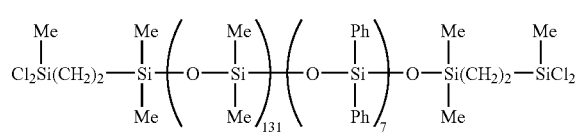

47 g of 2-hydroxy-1-acryloyloxy-3-methacryloyloxypropane (brand name: NK ester 701-A, manufactured by Shin-Nakamura Chemical Co., Ltd.), 200 ml of toluene, 26 g of triethylamine, and 2000 ppm of dibutylhydroxytoluene as a polymerization inhibitor, and with constant stirring, the temperature of the reaction mixture was raised to 70° C. and then maintained at this temperature for 7 hours to allow the reaction to proceed. Following subsequent cooling and filtering of the reaction liquid, 4 g of propylene oxide was added, the mixture was stirred for 1 hour at room temperature, and then a strip was conducted at 100° C./30 mmHg, yielding a transparent fluid organopolysiloxane represented by the structure shown below.

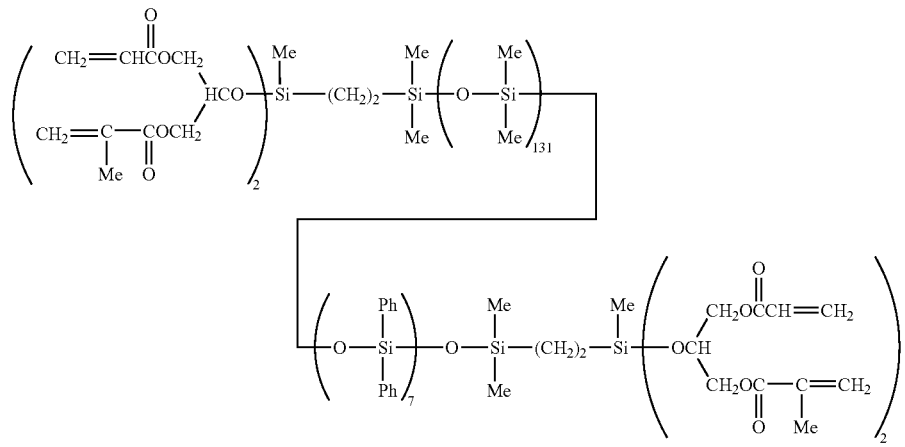

Example 1

(a) 20 parts of the acryloyloxy group-containing methylhydrogenpolysiloxane of the structure shown below, synthesized in the synthetic example 1 described above,

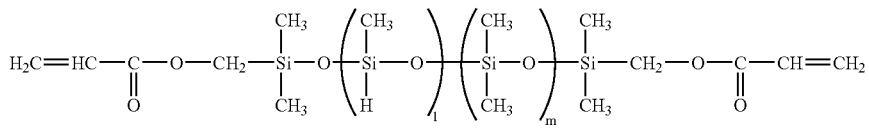

(wherein, l = 20, m = 80), (b) 100 parts of the (meth)acryloyloxy group-containing organopolysiloxane synthesized in the synthetic example 2 described above,
(c) 3 parts of a partial hydrolysis-condensation product of tetramethoxysilane, with a structure shown below,

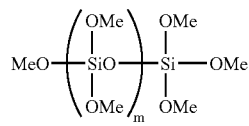

(said partial hydrolysis-condensation product is a mixture of compounds having the formula above in which m represents an integer of 1 to 7),
(d) 2 parts of 2-hydroxy-2-methyl-1-phenylpropan-1-one,
(e) 0.1 parts of an octyl alcohol-modified solution of chloroplatinic acid (equivalent to a weight ratio of platinum metal atoms within chloroplatinic acid/[(a)+(b)]=17 ppm, and a number of platinum metal atoms=1×10$^{-5}$ mols), and
(f) 0.1 parts of a 50% by weight toluene solution of 1-ethynyl-1-cyclohexanol (equivalent to 40 mols of 1-ethynyl-1-cyclohexanol per 1 mol of platinum metal atoms within the component (e)) were mixed together and yielded a curable silicone rubber composition. (the weight ratio of (c)/[(a)+(b)]=2.5/100)

This composition was poured into a metal mold having surfaces nickel-plated with a length of 100 mm, a width of 100 mm, and a depth of 1 mm, and then irradiated with ultraviolet radiation (radiation dose: 800 mJ/cm$^2$) for 2 seconds inside a conveyor furnace equipped with two metal halide mercury lamps (illumination intensity: 400 mW/cm$^2$) to cure the composition. The adhesive silicone elastomer film 80 μm thick thus obtained was taken out of the metal mold, and then the hardness of the film was measured in accordance with JIS K6301 using a spring type A hardness tester. The result is shown in Table 1.

Next, the silicone elastomer film thus obtained was cut into pieces 25 mm long×10 mm wide, and a piece of the elastomer film was sandwiched between two sheets of aluminum, silicon wafer, polyimide film, glass or polycarbonate to prepare a laminate. The laminate was then adhered at a pressure of 9.8 kPa, and subsequently heated for 60 minutes at 160° C. to cure the film to produce a structural body. The adhesion under shear was then measured. The adhesion under shear was measured, as shown in FIG. 1, by sandwiching the film layer 3 with a thickness of 80 μm between two sheets 1 and 2 100 mm long, 25 mm wide and 50 μm thick of a material mentioned above over a length of 10 mm at their respective terminal parts, and then pulling the ends 4 and 5 of the sheets 1 and 2 to the respective directions designated with arrows. The results are shown in Table 2.

Example 2

With the exception of using 3 parts of an epoxy group-containing polyalkoxysiloxane with a structure shown below instead of the component (c) described in Example 1 above, a composition was prepared in the same manner as Example 1, and this composition was then used to produce an adhesive silicone elastomer film and a structural body, which were subjected to the same tests as Example 1. The results of the tests are shown in Table 1 and Table 2.

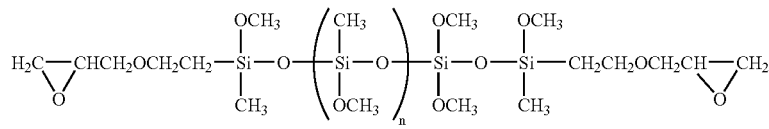

(wherein, n = 6)

Example 3

With the exception of using 1 part of a triisocyanurate silicone-modified compound with a structure shown below instead of the component (c) described in Example 1 above, a composition was prepared in the same manner as Example 1 (with a weight ratio (c)/[(a)+(b)]=0.8/100), and this composition was then used to produce an adhesive silicone elastomer film and a structural body, which were subjected to the same tests as Example 1. The results of the tests are shown in Table 1 and Table 2.

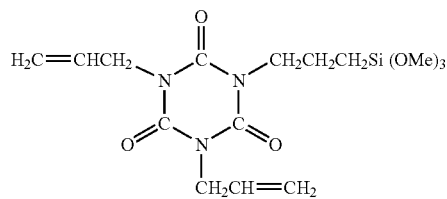

Example 4

With the exception of using 20 parts of an acryloyloxy group-containing methylhydrogenpolysiloxane with a structure shown below instead of the component (a) described in Example 1 above, a composition was prepared in the same manner as Example 1, and this composition was then used to produce an adhesive silicone elastomer film and a structural body, which were subjected to the same tests as Example 1. The results of the tests are shown in Table 1 and Table 2.

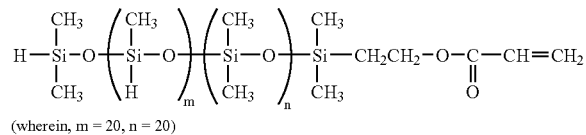

(wherein, m = 20, n = 20)

Example 5

With the exception of altering the quantity added of the component (a) of Example 1 from 20 parts to 5 parts, a composition was prepared in the same manner as Example 1 (with a weight ratio (c)/[(a)+(b)]=2.9/100), and this composition was then used to produce an adhesive silicone elastomer film and a structural body, which were subjected to the same tests as Example 1. The results of the tests are shown in Table 1 and Table 2.

Example 6

With the exception of altering the quantity added of the component (a) of Example 1 from 20 parts to 100 parts, a composition was prepared in the same manner as Example 1 (with a weight ratio (c)/[(a)+(b)]=1.5/100), and this composition was then used to produce an adhesive silicone elastomer film and a structural body, which were subjected to the same tests as Example 1. The results of the tests are shown in Table 1 and Table 2.

Example 7

With the exceptions of not using the component (b) from Example 1, and altering the quantity added of the component (a) from 20 parts to 100 parts, a composition was prepared in the same manner as Example 1 (with a weight ratio (c)/(a)=3/100), and this composition was then used to produce an adhesive silicone elastomer film and a structural body, which were subjected to the same tests as Example 1. The results of the tests are shown in Table 1 and Table 2.

Comparative Example 1

With the exception of not using the component (e) (the platinum catalyst) and the component (f) (the retarding agent) from Example 1 described above, a composition was prepared in the same manner as Example 1, and this composition was then used to produce an adhesive silicone elastomer film and a structural body, which were subjected to the same tests as Example 1. The results of the tests are shown in Table 1 and Table 2.

Comparative Example 2

With the exception of not using the component (e) and the component (f) from Example 2 described above, a composition was prepared in the same manner as Example 2, and this composition was then used to produce an adhesive silicone elastomer film and a structural body, which were subjected to the same tests as Example 1. The results of the tests are shown in Table 1 and Table 2.

Comparative Example 3

With the exception of not using the component (e) and the component (f) from Example 3 described above, a composition was prepared in the same manner as Example 3, and this composition was then used to produce an adhesive silicone elastomer film and a structural body, which were subjected to the same tests as Example 1. The results of the tests are shown in Table 1 and Table 2.

Comparative Example 4

With the exception of not using the component (e) and the component (f) from Example 4 described above, a composition was prepared in the same manner as Example 4, and this composition was then used to produce an adhesive silicone elastomer film and a structural body, which were subjected to the same tests as Example 1. The results of the tests are shown in Table 1 and Table 2.

TABLE 1

<Hardness following 800 mJ/cm$^2$ irradiation>

|  | Example 1 | Example 2 | Example 3 | Example 4 | Example 5 | Example 6 | Example 7 |
|---|---|---|---|---|---|---|---|
| Hardness | 50 | 51 | 52 | 49 | 50 | 50 | 50 |

|  | Comparative example 1 | Comparative example 2 | Comparative example 3 | Comparative example 4 |
|---|---|---|---|---|
| Hardness | 50 | 51 | 52 | 49 |

(Note)
Measured using an A-type spring-type hardness tester

TABLE 2

|  | Substrates | Examples | | | | | | | Comparative Examples | | | |
|---|---|---|---|---|---|---|---|---|---|---|---|---|
|  |  | 1 | 2 | 3 | 4 | 5 | 6 | 7 | 1 | 2 | 3 | 4 |
| 160° C. 60 minutes | Silicon wafer | 2.3 | 2.3 | 2.5 | 2.6 | 2.3 | 2.7 | 2.6 | 0.8 | 0.7 | 0.7 | 0.6 |
|  | Aluminum | 2.3 | 2.3 | 2.6 | 2.5 | 2.0 | 2.3 | 2.6 | 0.8 | 0.6 | 0.7 | 0.6 |
|  | Glass | 2.3 | 2.4 | 2.1 | 2.3 | 2.1 | 2.2 | 2.4 | 0.7 | 0.6 | 0.6 | 0.5 |
|  | Polyimide film | 2.1 | 2.3 | 2.1 | 1.9 | 2.3 | 2.3 | 2.1 | 0.5 | 0.5 | 0.3 | 0.2 |
|  | Polycarbonate | 1.9 | 1.8 | 1.7 | 1.7 | 1.8 | 1.9 | 1.7 | 0.3 | 0.3 | 0.3 | 0.2 |

Note:
units = MPa

Example 8

With the exception of not adding the 3 parts of the partial hydrolysis-condensation product of tetramethoxysilane of the component (c), a radiation curing silicone rubber composition was prepared in the same manner as Example 1, and this composition was then used to produce an adhesive silicone elastomer film and a structural body, which were subjected to the same tests as Example 1. The results of the tests are shown in Table 3 and Table 4.

Example 9

With the exception of not adding the 3 parts of the partial hydrolysis-condensation product of tetramethoxysilane of the component (c), a radiation curing silicone rubber composition was prepared in the same manner as Example 4, and this composition was then used to produce an adhesive silicone elastomer film and a structural body, which were subjected to the same tests as Example 1. The results of the tests are shown in Table 3 and Table 4.

Example 10

With the exception of not adding the 3 parts of the partial hydrolysis-condensation product of tetramethoxysilane of the component (c), a radiation curing silicone rubber composition was prepared in the same manner as Example 5, and this composition was then used to produce an adhesive silicone elastomer film and a structural body, which were subjected to the same tests as Example 1. The results of the tests are shown in Table 3 and Table 4.

Example 11

With the exception of not adding the 3 parts of the partial hydrolysis-condensation product of tetramethoxysilane of the component (c), a radiation curing silicone rubber composition was prepared in the same manner as Example 6, and this composition was then used to produce an adhesive silicone elastomer film and a structural body, which were subjected to the same tests as Example 1. The results of the tests are shown in Table 3 and Table 4.

Example 12

With the exception of not adding the 3 parts of the partial hydrolysis-condensation product of tetramethoxysilane of the component (c), a radiation curing silicone rubber composition was prepared in the same manner as Example 7, and this composition was then used to produce an adhesive silicone elastomer film and a structural body, which were subjected to the same tests as Example 1. The results of the tests are shown in Table 3 and Table 4.

TABLE 3

<Hardness following 800 mJ/cm$^2$ irradiation>

|  | Example 8 | Example 9 | Example 10 | Example 11 | Example 12 |
|---|---|---|---|---|---|
| Hardness | 50 | 49 | 50 | 50 | 50 |

TABLE 4

|  | Substrates | Examples | | | | |
|---|---|---|---|---|---|---|
|  |  | 8 | 9 | 10 | 11 | 12 |
| 160° C. 60 minutes | Silicon wafer | 2.2 | 2.5 | 2.0 | 2.6 | 2.5 |
|  | Aluminum | 2.1 | 2.4 | 2.0 | 2.2 | 2.5 |
|  | Glass | 2.2 | 2.2 | 2.0 | 2.0 | 2.3 |
|  | Polyimide film | 2.0 | 1.8 | 2.2 | 2.1 | 2.0 |
|  | Polycarbonate | 1.8 | 1.6 | 1.7 | 1.7 | 1.7 |

Note:
units = MPa

Example 13

(a1) 20 parts of the acryloyloxy group-containing methylhydrogenpolysiloxane of the structure shown below, synthesized in the synthetic example 1 described above,

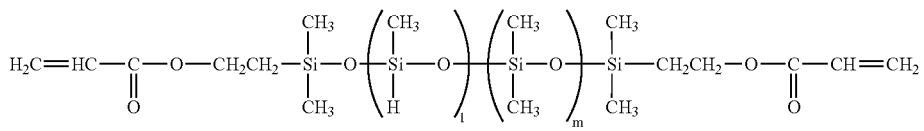

(wherein, l = 20, m = 80), (b) 100 parts of the (meth)acryloyloxy group-containing organopolysiloxane having the structure shown below, synthesized in the synthetic example 2 described above,

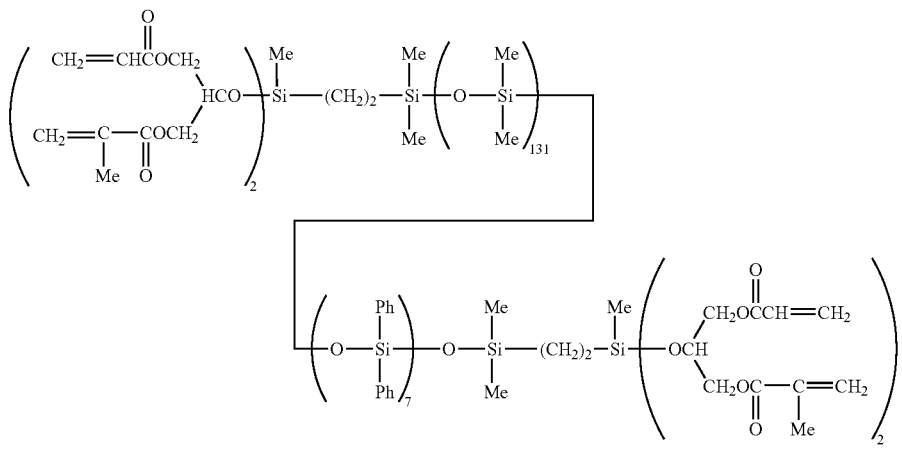

(c) 3 parts of a partial hydrolysis-condensation product of tetramethoxysilane, with a structure shown below (the weight ratio of (c)/[(a1)+(b)]=2.5/100),

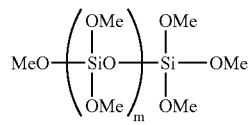

(said partial hydrolysis-condensation product is a mixture of compounds having the formula in which m represents an integer of 1 to 7),
(d) 2 parts of 2-hydroxy-2-methyl-1-phenylpropan-1-one,
(e) 0.1 parts of an octyl alcohol-modified solution of chloroplatinic acid (equivalent to a weight ratio of platinum metal atoms within chloroplatinic acid/[(a1)+(b)]=17 ppm, and a number of platinum metal atoms=1×10$^{-5}$ mols), and
(f) 0.1 parts of a 50% by weight toluene solution of 1-ethynyl-1-cyclohexanol (equivalent to 40 mols of 1-ethynyl-1-cyclohexanol per 1 mol of platinum metal atoms within the component (e)) were mixed together and yielded a curable silicone rubber composition with a viscosity of 5 Pa·s.

This composition was applied to the central region of a silicon wafer (diameter 5 inch) which was rotated for 60 seconds at a rotational speed of 1,000 rpm using a spin coater, thereby forming a uniform resin layer with a thickness of 20 μm. This resin layer was then irradiated with ultraviolet radiation (radiation dose: 800 mJ/cm$^2$) for 2 seconds inside a conveyor furnace equipped with two metal halide mercury lamps (illumination intensity: 400 mW/cm$^2$) to cure the composition. The hardness of the thus obtained adhesive silicone elastomer film on top of the silicon wafer was measured in accordance with JIS K6301 (using a spring type A hardness tester). The result is shown in Table 5.

Next, the adhesive silicone elastomer film-coated silicon wafer was cut into pieces 25 mm high×10 mm wide using a dicing device, another substrate formed of aluminum, silicon wafer, polyimide film, glass or polycarbonate was positioned on the adhesive silicone elastomer film surface of the rectangular silicon wafer test piece, and the structure was then adhered at a pressure of 9.8 kPa, and subsequently heated for 60 minutes at 160° C. to cure the film and complete the production of a structural body. The adhesion under shear was then measured (units: MPa) using a push-pull type measuring device. The results are shown in Table 6.

Example 14

With the exception of using 3 parts of an epoxy group-containing polyalkoxysiloxane (c2) with a structure shown below instead of the component (c) described in Example 13 above, a composition was prepared in the same manner as Example 13, and this composition was then used to produce an adhesive silicone elastomer film and a structural body, which were subjected to the same tests as Example 13. The results of the tests are shown in Table 5 and Table 6.

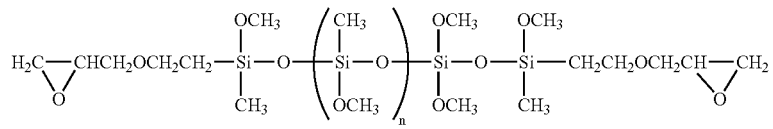

(wherein, n = 6)

Example 15

With the exception of using 1 part of a triisocyanurate silicone-modified compound (c3) with a structure shown below instead of the component (c) described in Example 13 above, a composition was prepared in the same manner as Example 13 (with a weight ratio (c3)/[(a1)+(b)]=0.8/100), and this composition was then used to produce an adhesive silicone elastomer film and a structural body, which were subjected to the same tests as Example 13. The results of the tests are shown in Table 5 and Table 6.

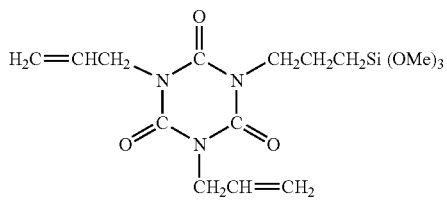

Example 16

With the exception of using 20 parts of an acryloyloxy group-containing methylhydrogenpolysiloxane (a2) with a structure shown below instead of the component (a1) described in Example 13 above, a composition was prepared in the same manner as Example 13, and this composition was then used to produce an adhesive silicone elastomer film and a structural body, which were subjected to the same tests as Example 13. The results of the tests are shown in Table 5 and Table 6.

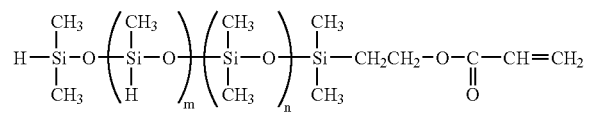

(wherein, m = 20, n = 20)

Example 17

With the exception of altering the quantity added of the component (a1) of Example 13 from 20 parts to 5.0 parts, a composition was prepared in the same manner as Example 13 (with a weight ratio (c)/[(a1)+(b)]=2.9/100), and this composition was then used to produce an adhesive silicone elastomer film and a structural body, which were subjected to the same tests as Example 13. The results of the tests are shown in Table 5 and Table 6.

Example 18

With the exception of altering the quantity added of the component (a1) of Example 13 from 20 parts to 100 parts, a composition was prepared in the same manner as Example 13 (with a weight ratio (c)/[(a1)+(b)]=1.5/100), and this composition was then used to produce an adhesive silicone elastomer film and a structural body, which were subjected to the same tests as Example 13. The results of the tests are shown in Table 5 and Table 6.

Example 19

With the exceptions of not using the component (b) from Example 13, and altering the quantity added of the component (a1) from 20 parts to 100 parts, a composition was prepared in the same manner as Example 13 (with a weight ratio (c)/(a1)=3/100), and this composition was then used to produce an adhesive silicone elastomer film and a structural body, which were subjected to the same tests as Example 13. The results of the tests are shown in Table 5 and Table 6.

Example 20

(a3) 20 parts of the acryloyloxy group-containing methyl-hydrogenpolysiloxane of the structure shown below,

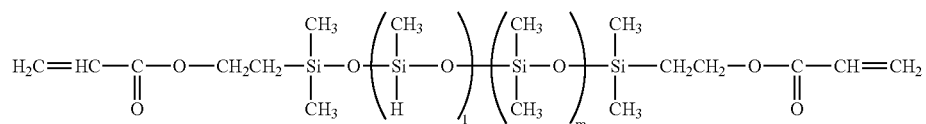

(wherein, l = 100, m = 400), (b) 100 parts of the (meth)acryloyloxy group-containing organopolysiloxane of the structure shown below,

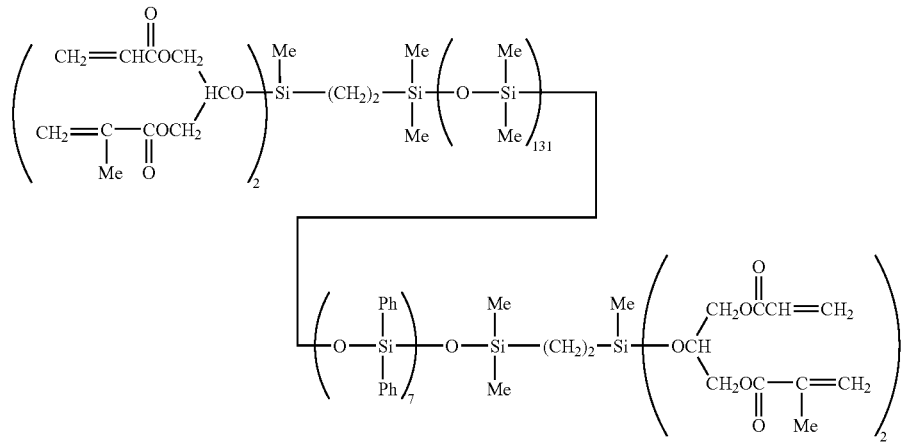

(c) 3 parts of a partial hydrolysis-condensation product of tetramethoxysilane, with a structure shown below (the weight ratio of (c)/[(a3)+(b)]=2.5/100),

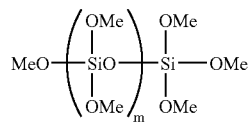

(said partial hydrolysis-condensation product is a mixture of compounds having the formula in which m represents an integer of 1 to 7),
(d) 2 parts of 2-hydroxy-2-methyl-1-phenylpropan-1-one,
(e) 0.1 parts of an octyl alcohol-modified solution of chloroplatinic acid (equivalent to a weight ratio of platinum metal atoms within chloroplatinic acid/[(a3)+(b)]=17 ppm, and a number of platinum metal atoms=$1\times10^{-5}$ mols), and
(f) 0.1 parts of a 50% by weight toluene solution of 1-ethynyl-1-cyclohexanol (equivalent to 40 mols of 1-ethynyl-1-cyclohexanol per 1 mol of platinum metal atoms within the component (e)) were mixed together and yielded a curable silicone rubber composition with a viscosity of 80 Pa·s.

This composition was screen printed onto a silicon wafer (diameter 5 inch), thereby forming a uniform resin layer with a thickness of 30 μm. This resin layer was then irradiated with ultraviolet radiation (radiation dose: 800 mJ/cm$^2$) for 2 seconds inside a conveyor furnace equipped with two metal halide mercury lamps (illumination intensity: 400 mW/cm$^2$) to cure the composition. The hardness of the thus obtained adhesive silicone elastomer film was measured in the same manner as Example 13. The result is shown in Table 5.

Using this silicon wafer, a structural body was then produced in the same manner as Example 13, and the adhesion under shear was measured. The result is shown in Table 6.

Example 21

With the exceptions of not using the component (b) from Example 20, and altering the quantity added of the component (a3) from 20 parts to 100 parts, a composition was prepared in the same manner as Example 20 (with a weight ratio (c)/(a3)=3/100), and this composition was then used to produce an adhesive silicone elastomer film and a structural body, which were subjected to the same tests as Example 13. The results of the tests are shown in Table 5 and Table 6.

Comparative Example 5

With the exception of not using the component (e) (the platinum group metal-based catalyst) and the component (f) (the reaction retarding agent) from Example 13 described above, a composition was prepared in the same manner as Example 13, and this composition was then used to produce an adhesive silicone elastomer film and a structural body, which were subjected to the same tests as Example 13. The results of the tests are shown in Table 5 and Table 6.

Comparative Example 6

With the exception of not using the component (e) and the component (f) from Example 13 described above, a composition was prepared in the same manner as Example 14, and this composition was then used to produce an adhesive silicone elastomer film and a structural body, which were subjected to the same tests as Example 13. The results of the tests are shown in Table 5 and Table 6.

Comparative Example 7

With the exception of not using the component (e) and the component (f) from Example 13 described above, a composition was prepared in the same manner as Example 15, and this composition was then used to produce an adhesive silicone elastomer film and a structural body, which were subjected to the same tests as Example 13. The results of the tests are shown in Table 5 and Table 6.

Comparative Example 8

With the exception of not using the component (e) and the component (f) from Example 13 described above, a composition was prepared in the same manner as Example 16, and this composition was then used to produce an adhesive silicone elastomer film and a structural body, which were subjected to the same tests as Example 13. The results of the tests are shown in Table 5 and Table 6.

TABLE 5

| | Example 13 | Example 14 | Example 15 | Example 16 | Example 17 | Example 18 | Example 19 |
|---|---|---|---|---|---|---|---|
| Hardness | 50 | 51 | 52 | 49 | 50 | 50 | 50 |

| | Example 20 | Example 21 | Comparative Example 5 | Comparative Example 6 | Comparative Example 7 | Comparative Example 8 |
|---|---|---|---|---|---|---|
| Hardness | 40 | 70 | 50 | 51 | 52 | 49 |

TABLE 6

| | | Examples | | | | | | | | Comparative Examples | | | |
|---|---|---|---|---|---|---|---|---|---|---|---|---|---|
| | Substrates | 13 | 14 | 15 | 16 | 17 | 18 | 19 | 20 | 21 | 5 | 6 | 7 | 8 |
| 160° C. 60 minutes | Silicon wafer | 2.3 | 2.3 | 2.5 | 2.6 | 2.3 | 2.6 | 2.6 | 2.7 | 3.5 | 0.8 | 0.7 | 0.7 | 0.6 |
| | Aluminum | 2.3 | 2.3 | 2.6 | 2.5 | 2.0 | 2.3 | 2.6 | 2.7 | 3.6 | 0.8 | 0.6 | 0.7 | 0.6 |
| | Glass | 2.3 | 2.4 | 2.1 | 2.3 | 2.1 | 2.2 | 2.4 | 2.3 | 3.0 | 0.7 | 0.6 | 0.6 | 0.5 |
| | Polyimide film | 2.1 | 2.3 | 2.1 | 1.9 | 2.3 | 2.3 | 2.1 | 2.0 | 2.8 | 0.5 | 0.5 | 0.3 | 0.2 |
| | Polycarbonate | 1.9 | 1.8 | 1.7 | 1.7 | 1.8 | 1.9 | 1.7 | 1.8 | 2.5 | 0.3 | 0.3 | 0.3 | 0.2 |

Note:
units = MPa

A radiation curing silicone rubber composition of the present invention is converted to a clean adhesive silicone elastomer film of uniform shape by a short term irradiation following molding.

This adhesive silicone elastomer film offers the following advantages:

(1) the film displays powerful adhesion on short term heating, and also offers good workability, and can consequently be formed into an adhesive layer of a prescribed shape by cutting;
(2) the film has low elasticity, and consequently displays good relaxation of the thermal and mechanical stress that develops when two different substrate are bonded together, leading to an improvement in the stability and reliability of film-adhered products e.g., a coated body or a bonded structural body;
(3) the film is a cured product, and is consequently easy to handle;
(4) the film is supplied as a film type molded product, and consequently enables a rationalization of the usage process (the process for producing a film-adhered product); and
(5) the film is useful to produce a semiconductor device, as an embodiment of the structural body, in which a semiconductor chip is bonded via the film to a support for the semiconductor chip.

Furthermore, the curable composition can be applied on a substrate, followed by irradiation with a radiation, to form an adhesive silicone elastomer layer on the substrate, and another substrate can be adhered to the adhesive layer to produce the structural body. In either cases, the production process is easier and simpler. Furthermore, there are absolutely no problems associated with the physical properties of the cured product of the silicone elastomer that forms the adhesive layer, and because the adhesion generated is powerful, and the elasticity is low, the thermal and mechanical stress that develops when two different substrates are bonded together can be effectively relaxed, enabling the production of a structural body, e.g., a semiconductor device with good stability and reliability.

What is claimed is:

1. A radiation curing silicone rubber composition comprising:
 (a) 5 to 100 parts by weight of an organohydrogenpolysiloxane containing at least one group selected from the group consisting of acryloyl groups and methacryloyl groups, and at least one hydrosilyl group within each molecule;
 (b) 95 to 0 parts by weight of a fluid organopolysiloxane with at least two groups which are each selected from the group consisting of acryloyl groups and methacryloyl groups within each molecule, and with no hydrosilyl groups,
 (wherein, a combined weight of said component (a) and said component (b) is 100 parts by weight);
 (c) 0 to 30 parts by weight of at least one compound selected from the group consisting of alkoxysilanes, partial hydrolysis-condensation products of alkoxysilanes, organosilane-modified isocyanurates and organosiloxane-modified isocyanurates;
 (d) an effective quantity of a radiation sensitizer; and
 (e) an effective quantity of a platinum group metal-based catalyst.

2. The composition according to claim 1, wherein a quantity of said component (c), relative to 100 parts by weight of a combination of said component (a) and said component (b), is within a range from 0.1 to 30 parts by weight.

3. The composition according to claim 1, wherein a quantity of said platinum group metal-based catalyst of said component (e) is within a range from 0.01 to 2,000 ppm relative to a combined weight of said component (a) and said component (b).

4. The composition according to claim 1, further comprising (f) a reaction retarding agent.

5. The composition according to claim 4, wherein a quantity of said reaction retarding agent of said component (f) is within a range from 1 to 1,000 mols per 1 mol of platinum group metal within said platinum group metal-based catalyst of said component (e).

6. An adhesive silicone elastomer film comprising a radiation-cured product of a composition according to claim 1.

7. The film according to claim 6, wherein said radiation-cured product has been cured with irradiation with ultraviolet radiation.

8. A silicone elastomer film coated body produced by covering a portion of, or all of, a substrate with the adhesive silicone elastomer film according to claim 6, and subsequently applying heat to bond said film to said substrate.

9. A structural body comprising a first substrate, a second substrate, and an adhesive layer present between both substrates and binding both substrates to each other, said adhesive layer comprising a cured product of a composition according to claim 1.

10. The structural body according to claim 9, wherein either said first substrate or said second substrate is a semiconductor chip, and the remaining substrate is a support for the semiconductor chip, thereby said structural body forming a semiconductor device.

11. A method of producing a structural body according to claim 9, comprising the steps of molding a radiation curing silicone rubber composition according to claim 1 into a film on top of a first substrate to form a film type molded body, irradiating said film type molded body with radiation to generate an adhesive elastomer film, adhering a second substrate on top of said elastomer film, and subsequently curing said elastomer film by heat treatment.

12. The method according to claim 11, wherein either said first substrate or said second substrate is a semiconductor chip, and the remaining substrate is a support for the semiconductor chip.

13. The method according to claim 11, wherein said composition is formed into a film on top of said first substrate by spin coating.

14. The method according to claim 11, wherein said composition is formed into a film on top of said first substrate by screen printing method.

15. The method according to claim 11, wherein said radiation is ultraviolet radiation.

16. A method of producing a structural body comprising a first substrate, a second substrate, and and adhesive present between both substrates and binding both substrates to each other comprising the steps of sandwiching an adhesive silicone elastomer film according to claim 6 between the first substrate and the second substrate, and subsequently applying heat to bond said film to both substrates, thereby bonding said two substrates mutually together.

17. The method according to claim 16, wherein either said first substrate or said second substrate is a semiconductor chip, and the remaining substrate is a support for the semiconductor chip.

18. The structural body of claim 9 having an adhesion under shear of greater than 1.5 MPa wherein
the first substrate and the second substrate are 100 mm long, 25 mm wide and 50 μm thick,
the adhesive layer is 80 μm and
the substrates are selected from the group consisting of aluminum, silicon wafer, polyimide film, glass and polycarbonate.

* * * * *